United States Patent
Colominas Tutusaus et al.

(10) Patent No.: US 10,060,039 B2
(45) Date of Patent: Aug. 28, 2018

(54) ANTI-CORROSIVE ZINC PRIMER COATING COMPOSITIONS COMPRISING HOLLOW GLASS SPHERES AND A CONDUCTIVE PIGMENT

(71) Applicant: Hempel A/S, Kgs. Lyngby (DK)

(72) Inventors: Salvador Colominas Tutusaus, Polinyà (ES); Santiago Arias Codolar, Barcelona (ES); Torben Schandel, Kgs. Lyngby (DK); Tomás Alhambra Redondo, Polinyà (ES); Andreas Lundtang Paulsen, Vanløse (DK)

(73) Assignee: HEMPEL A/S, Kgs. Lyngby (DK)

( * ) Notice: Subject to any disclaimer, the term of this patent is extended or adjusted under 35 U.S.C. 154(b) by 289 days.

(21) Appl. No.: 14/421,110

(22) PCT Filed: Jul. 12, 2013

(86) PCT No.: PCT/EP2013/064867
§ 371 (c)(1),
(2) Date: Feb. 11, 2015

(87) PCT Pub. No.: WO2014/032844
PCT Pub. Date: Mar. 6, 2014

(65) Prior Publication Data
US 2015/0232998 A1  Aug. 20, 2015

(30) Foreign Application Priority Data
Aug. 29, 2012  (EP) .................... 12182173

(51) Int. Cl.
| C09D 5/10 | (2006.01) |
| C23F 13/14 | (2006.01) |
| C08K 3/04 | (2006.01) |
| C09D 7/40 | (2018.01) |
| B65D 81/32 | (2006.01) |
| C09D 5/08 | (2006.01) |
| C08K 7/28 | (2006.01) |
| C09D 5/24 | (2006.01) |
| C08K 3/08 | (2006.01) |

(52) U.S. Cl.
CPC .............. *C23F 13/14* (2013.01); *B65D 81/32* (2013.01); *C08K 3/04* (2013.01); *C08K 7/28* (2013.01); *C09D 5/084* (2013.01); *C09D 5/106* (2013.01); *C09D 5/24* (2013.01); *C09D 7/70* (2018.01); *C08K 2003/0893* (2013.01); *Y10T 428/249974* (2015.04)

(58) Field of Classification Search
CPC .......... C09D 5/106; C09D 5/084; C09D 7/70; C09D 5/24; C08K 7/28; C08K 2003/0893; C08K 3/04; B65D 81/32
See application file for complete search history.

(56) References Cited

U.S. PATENT DOCUMENTS

| 4,621,024 A | 11/1986 | Wright |
| 4,857,608 A | 8/1989 | Herzig et al. |
| 5,252,632 A | 10/1993 | Savin |
| 5,338,348 A | 8/1994 | Savin |
| 5,580,907 A | 12/1996 | Savin |
| 5,677,367 A * | 10/1997 | Savin ............... C09D 5/106 523/219 |
| 5,792,803 A | 8/1998 | Savin |
| 6,287,372 B1 | 9/2001 | Briand et al. |

FOREIGN PATENT DOCUMENTS

| AU | 2002234514 A1 | 9/2003 |
| CN | 1592773 A | 3/2005 |
| CN | 102408813 A | 4/2012 |
| JP | 59-193966 A | 11/1984 |
| JP | 8-73777 A | 3/1996 |
| JP | 9-176485 A | 7/1997 |
| JP | 10-235286 A | 9/1998 |
| JP | 2000-212472 A | 8/2000 |
| JP | 2005-68278 A | 3/2005 |
| JP | 2008-127470 A | 6/2008 |
| WO | WO 96/05257 A1 | 2/1996 |
| WO | WO 96/16109 A1 | 5/1996 |
| WO | WO 96/29372 A1 | 9/1996 |
| WO | WO 99/58274 A1 | 11/1999 |
| WO | WO 03/062328 A1 | 7/2003 |
| WO | WO 03/072660 A1 | 7/2003 |
| WO | WO 2008/003695 A1 | 1/2008 |
| WO | WO 2008/125610 A1 | 10/2008 |
| WO | WO 2012/035520 A1 | 3/2012 |

OTHER PUBLICATIONS

Potters "Engineered Glass Amterials Division Hollow Microsperes", url: http://www.pottersbeads.com/LinkClick.aspx?fileticket=VkPoZxJK-pl%3D&tabid=349&mid=1023, internet retrieval date Jan. 23, 2017.*
International Search Report for PCT/EP2013/064867 dated Oct. 10, 2013.

* cited by examiner

*Primary Examiner* — Jonathan C Langman
(74) *Attorney, Agent, or Firm* — Birch, Stewart, Kolasch & Birch, LLP

(57) ABSTRACT

The present invention concerns anti-corrosive coating compositions, in particular coating compositions for protecting iron and steel structures. In particular, the present invention relates to coating compositions comprising particulate zinc, conductive pigments, and hollow glass microspheres, e.g. epoxy based coatings. The invention furthermore concerns a kit of parts containing the composition, a method for its application, as well as metal structures coated with the composition.

18 Claims, No Drawings

ANTI-CORROSIVE ZINC PRIMER COATING COMPOSITIONS COMPRISING HOLLOW GLASS SPHERES AND A CONDUCTIVE PIGMENT

CROSS REFERENCE TO RELATED APPLICATOINS

This application is a U.S. National Phase Application of PCT International Application Number PCT/EP2013/064867, filed on Jul. 12, 2013, designating the United States of America and published in the English language, which is an International Application of and claims the benefit of priority to European Patent Application No. 12182173.0, filed on Aug. 29, 2013. The disclosures of the above-referenced applications are hereby expressly incorporated by reference in their entireties.

FIELD OF THE INVENTION

The present invention resides in the field of anti-corrosive coating compositions, in particular coating compositions for protecting iron and steel structures. In particular, the present invention relates to coating compositions comprising particulate zinc, conductive pigments, and glass microspheres, e.g. epoxy based coatings.

BACKGROUND OF THE INVENTION

Zinc primers, both organic and in-organic coatings, are extensively used in the marine and offshore industry and may also be specified for e.g. bridges, containers, refineries, petrochemical industry, power-plants, storage tanks, cranes, windmills and steel structures part of civil structures e.g. airports, stadia, tall buildings. Such coatings may be based on a number of binder systems, such as binder systems based on silicates, epoxy, polyurethanes, cyclized rubbers, phenoxy resin, epoxy ester, urethane alkyd etc.

In zinc primers, zinc is used as a conductive pigment to produce an anodically active coating. Zinc acts as sacrificial anodic material and protects the steel substrate, which becomes the cathode. The resistance to corrosion is dependent on the transfer of galvanic current by the zinc primer but as long as the conductivity in the system is preserved and as long there is sufficient zinc to act as anode the steel will be protected galvanically. Therefore, zinc pigment particles in zinc primers are packed closely together and zinc primers are typically formulated with very high loadings of zinc powder.

Various approaches have been used in order to reduce the zinc loadings in the art. U.S. Pat. No. 4,621,024 discloses coating microspheres with a metal substrate, such as zinc, resulting in an overall reduction in the metal component of the coating. U.S. Pat. No. 5,252,632 discloses the use of non-coated hollow glass microspheres for improving the corrosion protection of zinc-based coating compositions, as well as decreasing the density of the composition. U.S. Pat. Nos. 5,580,907 and 6,287,372 both disclose further efforts to reduce the amount of zinc dust in the compositions by incorporation of microspheres. WO 2008/125610 discloses the inclusion of certain zinc alloys for improving the corrosion protection of coating compositions. It is further disclosed that conductive pigments, such as carbon black, may improve corrosion inhibition.

WO 96/29372 discloses dry coating compositions for dissolving in a solvent in situ, said dry coating compositions containing graphite to avoid hard settling of the coating compositions.

WO 99/58274 discloses a coating composition containing carbon-modified zinc dust, zinc dust, and hollow glass spheres in an epoxy ester resin base. The carbon-modified zinc dust is not a simple mixture of carbon and zinc.

There is, however, still a need for improved corrosion resistance of steel-based metal structures, which is cost-effective and limits the amount of zinc applied to the protective coatings.

In order to establish sufficient corrosion protection and ensure optimum performance of the coating, it is necessary to specify the requirements for the protection paint system along with the relevant laboratory performance tests to assess its likely durability. The use of new technologies and paint formulations also means coatings being developed with little or no previous track record. This has resulted in more emphasis being placed on accelerated laboratory testing to evaluate coating performance. Many of these accelerated exposure tests will not, within their exposure time show the negative effects visually on intact coated surfaces. Therefore behaviour of the coatings around artificially made damages, e.g. scores, are given significant considerations and many prequalification tests are based amongst others on rust creep and blistering as well as detachment from scores, ISO 12944, NORSOK M-501, ISO 20340, NACE TM 0104, 0204, 0304, 0404, etc. (Weinell, C. E. and S. N. Rasmussen, Advancement in zinc rich epoxy primers for corrosion protection, NACE International, paper no. 07007 (2007)). These accelerated weathering methods seek to intensify the effects from the environment so that the film breakdown occurs more rapidly (Mitchell, M. J., Progress in offshore coatings, NACE International, paper no. 04001 (2004)). The lower the rust creep the better overall anticorrosive performance.

SUMMARY OF THE INVENTION

The improved corrosion resistance of steel-based metal structures is achieved with a coating composition comprising:
a) a binder system selected from epoxy-based binder systems, polysiloxane-based binder systems, polyurethane-based binder systems, cyclized rubber-based binder systems, and phenoxy resin-based binder systems,
b) zinc particles,
c) hollow glass microspheres, and
d) a conductive pigment selected from the group consisting of graphite, carbon black, aluminium pigments, black iron oxide, antimony-doped tin oxide, mica coated with antimony-doped tin oxide, indium tin oxide, carbon nanotubes, carbon fibres, and any mixture thereof.

In one embodiment, providing particularly good corrosion resistance, the coating composition according to the present invention contains a conductive pigment selected from carbon black, graphite, and any mixture thereof.

DETAILED DESCRIPTION OF THE INVENTION

It should be understood that the present invention in principle is applicable for any type of binder system in which zinc powder can be incorporated, e.g. anti-corrosive coating compositions of the conventional type. Some examples hereof are coating composition comprising a binder system selected from epoxy-based binder systems, polysiloxane-based binder systems, polyurethane-based binder systems, cyclized rubber-based binder systems, and phenoxy resin-based binder systems. In one embodiment, the coating composition of the present invention comprises a binder system selected from epoxy-based binder systems, polyurethane-based binder systems, and polysiloxane-based binder systems. In another embodiment, the coating composition of the present invention comprises a binder system selected from epoxy-based binder systems and polysiloxane-based binder systems. In yet another embodiment, said binder system is an epoxy-based binder system.

Epoxy-based Binder System

The term "epoxy-based binder system" should be construed as the combination of one or more epoxy resins, any curing agents, any reactive epoxy diluents, any epoxy modifiers, any extender resins, any epoxy accelerators, and any epoxy flexibilizers.

Examples of suitable reactive epoxy diluents comprise e.g. mono functional glycidyl ethers or esters of aliphatic, cycloaliphatic or aromatic compounds, e.g. Araldite DY-E/BD, ex. Huntsman Advanced Materials—Germany, Cardolite NC 513, ex. Cardanol Chemicals (US) and Cardura E10P ex. Momentive—Netherlands.

Examples of suitable epoxy modifiers comprise e.g. oils, oil derivatives, modified oils such as linseed oil and derivatives thereof, castor oil and derivatives thereof, soy bean oil and derivatives thereof.

Examples of suitable extender resins comprise e.g. saturated polyester resins, polyvinylacetate, polyvinylbutyrate, copolymers of vinyl acetate and vinyl isobutyl ether, copolymers of vinyl chloride and vinyl isobutyl ether, of polyvinyl methyl ether, polyvinyl isobutyl ether, polyvinyl ethyl ether, modified aromatic hydrocarbon resins; styrene copolymers such as styrene/butadiene copolymers; acrylic resins; hydroxy-acrylate copolymers; fatty acids; and cyclized rubbers.

The epoxy-based binder system may comprise one or more epoxy resins selected from aromatic or non-aromatic epoxy resins (e.g. hydrogenated epoxy resins), containing more than one epoxy group per molecule, which is placed internally, terminally, or on a cyclic structure, together with any suitable curing agent to act as cross-linking agent. Combinations with reactive diluents such as from the classes mono functional glycidyl ethers or esters of aliphatic, cycloaliphatic or aromatic compounds can be included in order to reduce viscosity and for improved application and physical properties.

Suitable epoxy-based binder systems are believed to include epoxy and modified epoxy resins selected from bisphenol A, bisphenol F, Novolac epoxies, non-aromatic epoxies, cycloaliphatic epoxies, epoxidised polysulfides, and epoxy functional acrylics or any combinations hereof. A particular epoxy-based binder system includes bisphenol A. Epoxy-based binder systems may be of the conventional type, such as solvent borne and water-borne epoxy resin based. Examples of suitable commercially available solvent-borne epoxy resins are:

Epikote 828, ex. Momentive (US), bisphenol A type
Araldite GY 250, ex. Huntsman Advanced Materials (Switzerland), bisphenol A
typeEpikote 1004, ex. Momentive (US) bisphenol A type
DER 664-20, ex. Dow Chemicals (Germany), bisphenol A type
Epikote 1001 X 75, ex. Momentive (US), bisphenol A type
Araldite GZ 7071X75BD, ex. Huntsman Advanced Materials (Germany), bisphenol A type in xylene
Araldite GZ 7071X75CH, ex. Huntsman Advanced Materials (Switzerland), bisphenol A type
DER 352, ex. Dow Chemicals (Germany), mixture of bisphenol A and bisphenol F
Epikote 235, ex. Momentive (US), mixture of bisphenol A and bisphenol F
Epikote 862, ex. Momentive (US), bisphenol F type
DEN 438-X 80, ex. Dow Chemical Company (USA), epoxy novolac
Epikote 1009, ex. Momentive (US), bisphenol A type
DER 684-EK40, ex. Dow Chemicals (Germany), bisphenol A typeEpikote 154, ex. Momentive (US) epoxy novolac Examples of suitable commercially available water-borne epoxy resins are:

Beckopox EP 385 W, ex Cytex Surface Specialities (Germany)
Epicote 3540 WY-55A, ex. Momentive (US)
EPI-REZ DPW 6520, ex. Momentive (US)
Beckopox VEP 2381 W, ex. Cytex Surface Specialities (Germany)

The epoxy-based binder system may comprise one or more curing agents selected from compounds or polymers comprising at least two reactive hydrogen atoms linked to nitrogen.

Suitable curing agents for solvent-borne epoxy resins are believed to include amines or amino functional polymers selected from aliphatic amines and polyamines (e.g. cycloaliphatic amines and polyamines), polyamidoamines, polyoxyalkylene amines (e.g. polyoxyalkylene diamines), aminated polyalkoxyethers (e.g. those sold commercially as "Jeffamines"), alkylene amines (e.g. alkylene diamines), aralkylamines, aromatic amines, Mannich bases (e.g. those sold commercially as "phenalkamines"), amino functional silicones or silanes, isocyanates, and including amine adducts and derivatives thereof. In one embodiment, the curing agents are polyamidoamines.

Examples of suitable commercially available curing agents are:

Jeffamine EDR-148 ex. Huntsman Corporation (USA), triethyleneglycoldiamine
Jeffamine D-230 ex. Huntsman Corporation (USA), polyoxypropylene diamine
Jeffamine D-400 ex. Huntsman Corporation (USA), polyoxypropylene diamine
Jeffamine T-403 ex. Huntsman Corporation (USA), polyoxypropylene triamine
Ancamine 1693 ex. Air Products (USA), cycloaliphatic polyamine adduct
Ancamine X2280 ex. Air Products (USA), cycloaliphatic amine
Ancamine 2074 ex. Air Products (USA), cycloaliphatic polyamine adduct
Ancamide 350 A ex. Air Products (USA), polyaminoamide
Sunmide CX-105X, ex. Air Products Inc., Mannich base
Epikure 3140 Curing Agent, ex. Momentive (USA), polyamidoamine
SIQ Amin 2030, ex. SIQ Kunstharze GmbH (Germany), polyamidoamine
Epikure 3115X-70 Curing Agent, ex. Momentive (USA), polyamidoamine
SIQ Amin 2015, ex. SIQ Kunstharze GmbH (Germany), polyamidoamine
Polypox VH 40309/12, ex. Dow Chemicals (USA), polyoxyalkylene amine
CeTePox 1490 H, ex. CTP Chemicals and Technologies for Polymers (Germany), polyoxyalkylene amine
Epoxy hardener MXDA, ex. Mitsubishi Gas Chemical Company Inc (USA), aralkyl amine Diethylaminopropylamine, ex. BASF (Germany), aliphatic amine
Gaskamine 240, ex. Mitsubishi Gas Chemical Company Inc (USA), aralkyl amine
Cardolite Lite 2002, ex. Cardanol Chemicals (USA), Mannich base
Aradur 42 BD, ex. Huntsman Advanced Materials (Germany), cycloaliphatic amine
Isophorondiamin, ex. BASF (Germany), cycloaliphatic amine
Epikure 3090 Curing Agent, ex. Momentive (USA), polyamidoamine adduct with epoxy
Crayamid E260 E90, ex. Arkema (France), polyamidoamine adduct with epoxy
Crayamid 140, ex. Arkema (France), amino polyamide resin
Aradur 943 CH, ex.
Huntsman Advanced Materials (Switzerland), alkylene amine adduct with epoxy
Aradur 863 XW 80 CH, ex. Huntsman Advanced Materials (Switzerland), aromatic amine adduct with epoxy
Cardolite NC-541, ex. Cardanol Chemicals (USA), Mannich base
Cardolite Lite 2001, ex. Cardanol Chemicals (USA), Mannich base Suitable curing agents for water-borne epoxy resins may include amine adducts selected from:
Beckopox Specialhärter EH 623W, ex. Cytex Surface Specialities (Germany)
Beckopox EH 613W, ex. Cytex Surface Specialities (Germany)
EPICURE DPC 6870, ex. Momentive (US)
Epilink 660, ex. Air Products (Italy)
Epilink 701, ex. Air Products (UK)

In one embodiment, epoxy-based binder systems comprise a) one or more epoxy resins selected from bisphenol A, bisphenol F and Novolac; and b) one or more curing agents selected from Mannich Bases, polyamidoamines, polyoxyalkylene amines, alkylene amines, aralkylamines, polyamines, and adducts and derivatives thereof. In a further embodiment, epoxy-based binder systems may comprise both bisphenol A and polyamidoamines.

In another embodiment, the epoxy resin may have an epoxy equivalent weight of 100-9000, 100-2000, such as 100-1500 e.g. 150-1000, such as 150-700.

In yet another embodiment, epoxy-based binder systems may comprise one or more bisphenol A epoxy resins having an epoxy equivalent weight of 150-700 and one or more polyamidoamine or adducts and derivatives thereof.

In one embodiment, epoxy-based binder systems are ambient curing binder systems.

For some epoxy-based binder systems the composition will form a suitable film without the addition of a curing agent. Hence, in another embodiment no curing agent is added to the paint composition.

In the coating composition, the total amount of epoxy-based binder system may in one embodiment be in the range of 15-80%, such as 20-65%, e.g. 30-50%, by solids volume of the coating composition.

When used herein, the term "hydrogen equivalents" is intended to cover only reactive hydrogen atoms linked to nitrogen.

The number of "hydrogen equivalents" in relation to the one or more curing agents is the sum of the contribution from each of the one or more curing agents. The contribution from each of the one or more curing agents to the hydrogen equivalents is defined as grams of the curing agent divided by the hydrogen equivalent weight of the curing agent, where the hydrogen equivalent weight of the curing agent is determined as: grams of the curing agent equivalent to 1 mol of active hydrogen. For adducts with epoxy resins the contribution of the reactants before adduction is used for the determination of the number of "hydrogen equivalents" in the epoxy-based binder system.

The number of "epoxy equivalents" in relation to the one or more epoxy resins is the sum of the contribution from each of the one or more epoxy resins. The contribution from each of the one or more epoxy resins to the epoxy equivalents is defined as grams of the epoxy resin divided by the epoxy equivalent weight of the epoxy resin, where the epoxy equivalent weight of the epoxy resin is determined as: grams of the epoxy resin equivalent to 1 mol of epoxy groups. For adducts with epoxy resins the contribution of the reactants before adductation is used for the determination of the number of "epoxy equivalents" in the epoxy-based binder system.

The ratio between the hydrogen equivalents of the one or more curing agents and the epoxy equivalents of the one or more epoxy resins may be in the range of 20:100 to 120:100, such as in the range 60:100 to 110:100 or 70:100 to 100:110, or such as 80:100 to 110:100.

Alternatively, the binder system of the coating composition is selected from polysiloxane-based binder systems, polyurethane-based binder systems, cyclized rubber-based binder systems, and phenoxy resin-based binder systems. Examples of such commercial coating compositions are of the type where zinc powder has conventionally been used. The binder system may or may not, depending on the specific binder system, need a curing agent. Hence, in one embodiment, the binder system comprises one or more curing agents. In another embodiment, the binder system does not comprise any curing agent.

Other suitable binder systems include one component coatings, such as binder systems based on vinyl-based polymers; copolymers of vinyl chloride and vinyl isobutyl ether; phenoxy; polyurethanes; cyclized rubbers including aromatic hydrocarbon resins, such as petroleum fraction condensates. Typically, no curing agent is added to such types of one component binder systems.

Examples of such commercially available resins suitable for one component zinc-containing coatings are:
Alplex CK 450, Cytec (cyclized rubber based)
Phenoxy PKHH, InChem (phenoxy based)

Polysiloxane-based Binder Systems

The term "polysiloxane-based binder system" should be construed as a binder system comprising at least one curable, polysiloxane modified constituent, wherein a major part of the binder system consists of polysiloxane moieties, i.e. at least 20% by volume solids, such as at least 25% by volume solids, preferably at least 35% by volume solids, e.g. more than 50% by volume solids, of the binder system is represented by polysiloxane moieties.

The polysiloxane moiety should be construed to include any pendant organic substituents, such as alkyl-, phenyl-, and/or saturated cyclic structures and may also comprise curable substituents, examples hereof are alkoxy groups, unsaturated acrylic groups etc.

In one embodiment, the polysiloxane-based binder system is a combination of one or more amino-functional silicone modified compound(s), one or more epoxy resins, any polysiloxane binder or polysiloxane modified binder constituent, any aminosilanes, any reactive epoxy diluents, any epoxy modifiers, any extender resins, any epoxy accelerators, and any epoxy flexibilizers.

The term "amino-functional silicone modified compound" is to be understood in the conventional sense, i.e. a silicone compound, e.g. a silane or polysiloxane compound, having pendant and/or terminal amino groups. Illustrative examples of amino-functional silicone compounds are amino-functional polysiloxanes and aminosilanes.

In a further embodiment of the invention, the amino-functional silicone compound(s) is/are amino-functional polysiloxane(s). The term "amino-functional polysiloxane" means a linear or branched polymeric constituent having one or more polysiloxane blocks and having pendant and/or terminal amino-functionalities.

The amino functionalities may, e.g., be introduced to the reactive polysiloxane by means of an aminosilane (i.e. an aminosilane such as those defined below), cf. U.S. Pat. No. 4,857,608. It should also be understood that the amino-functional polysiloxane may be prepared in situ. In some examples, a hydroxyl-functional or alkoxy-functional polysiloxane is reacted with an aminosilane whereby amino-functionalities are introduced. For example an aminosilane can be reacted with an α,ω-dihydroxypolydimethylsiloxane at a temperature in the range of 20-80° C., preferably using 0.4-5.0 alkoxy groups of the aminosilane per silanol group of the polysiloxane. If an excess of aminosilane is used, or if the reaction is not allowed to proceed to completion, a small amount of aminosilane may remain in the product. In one embodiment, at least one amino-functional polysiloxane is the reaction product of a polysiloxane and an aminosilane.

Examples of amino-functional polysiloxanes are α,ω-diamino-functional polysiloxanes (e.g. polysiloxane fluids). Illustrative examples of commercially available amino-functional polysiloxanes are SILRES HP 2000 (amino-functionalised methyl-phenyl silicone) ex Wacker Chemie—Germany; SF1708 (Amino functionalised polysiloxane fluid) ex General Electric Co.; etc.

In another embodiment, the amino-functional silicon compound(s) is/are aminosilane(s). In this embodiment, a polysiloxane binder or polysiloxane modified binder constituent acting as a reactive flexibiliser/co-binder is preferably present. Aminosilanes are frequently defined as silanes of the formula:

$$(RO)_xR_{3-x}SiR^1NHR^2$$

wherein each R independently is selected from $C_{1-8}$-alkyl (e.g. methyl, ethyl, hexyl, octyl, etc.), $C_{1-4}$-alkyl-O—$C_{2-4}$-alkyl; aryl (e.g. phenyl) and aryl-$C_{1-4}$-alkyl (e.g. benzyl); $R^1$ is selected from —$(CH_2)_{2-4}$—, methyl-substituted trimethylene, and —$(CH_2)_{2-3}$—O—$(CH_2)_{2-3}$; $R^2$ is selected from hydrogen and —$(CH_2)_{2-4}$—$NH_2$; x is an integer from 0-3 such as 0, 1, 2 or 3.

Illustrative examples of aminosilanes are $(CH_3O)_3Si(CH_2)_3NH(CH_2)_2NH_2$; $(CH_3CH_2OCH_2CH_2O)_3Si(CH_2)_2NH_2$; $(C_2H_5O)_3Si(CH_2)_3NH_2$; $(CH_3OCH_2CH_2O)_3Si(CH_2)_3NH_2$; $(C_2H_5O)_3Si(CH_2)_3O(CH_2)_3NH_2$; $(C_2H_5O)_2C_6H_5Si(CH_2)_3NH_2$; $(C_2H_5O)_3SiCH_2O(CH_2)_2NH_2$; $(C_2H_5O)_3Si(CH_2)_3O(CH_2)_2NH_2$; and $(C_2H_5O)_2CH_3Si(CH_2)_3NH_2$. Illustrative examples of commercially available aminosilanes are Dynasilan AMEO (3-aminopropyltriethoxysilane) ex Degussals Hüls; KBM603 (N-β-aminoethyl-γ-aminopropyltrimethoxysilane) ex Shin Etsu; etc.

Examples of "polysiloxane binder or polysiloxane modified binder" include polysiloxanes having the formula:

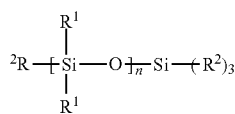

wherein n is an integer from 3-50, each $R^1$ is independently selected from $C_{1-6}$-alkyl (e.g. methyl, ethyl, etc.); $C_{1-6}$-hydroxyalkyl (e.g. hydroxymethyl, hydroxyethyl etc.); $C_{1-6}$-alkoxy (e.g. methoxy, ethoxy, propoxy etc.) and each $R^2$ is independently selected from silanol, $C_{1-6}$-alkyl (e.g. methyl, ethyl, etc.); $C_{1-6}$-hydroxyalkyl (e.g. hydroxymethyl, hydroxyethyl etc.); $C_{1-6}$-alkoxy(e.g. methoxy, ethoxy, propoxy etc.). In an embodiment, the polysiloxane binder or polysiloxane modified binder is a polysiloxane binder including methoxy groups.

In a still further embodiment, the amino-functional silicon compound(s) is/are the combination of amino-functional polysiloxane(s) and aminosilane(s), i.e. the binder phase comprises one or more amino-functional polysiloxanes as well as one or more aminosilane(s). This combination can be accomplished by adding an amino-functional polysiloxane (as described above) and an aminosilane (as defined above), or by using a reaction product between an aminosilane and a polysiloxane in which a portion of the aminosilane remains unreacted.

The "one or more epoxy resins" are similar to the epoxy resins described under the epoxy-based binder system section above.

Examples of suitable commercially available epoxy resins comprise e.g. Adeka resin EP-4080E ADEKA Corporation—Japan (aliphatic epoxy resin) and Epikote 828, ex. Momentive (US), bisphenol A type.

Other suitable polysiloxane-based binder systems are e.g. described in WO 96/16109, WO 01/51575 and WO 2009/823691.

Polyurethane-based Binder System

The term "polyurethane-binder system" is intended to mean a binder system having as the primary components one or more di- or poly-isocyanate components and a hydroxy functional component containing two or more hydroxyl groups (two component systems) or having as the primary components one or more isocyanate prepolymers (typically one component systems).

Reaction (curing) of the isocyanate component(s) and the hydroxy functional component(s) results in the formation of a urethane-functionality.

One type of polyurethane-based binder system contains
a) a poly-isocyanate component and
b) a hydroxy functional component comprising at least two hydroxyl groups The cross-linking which takes place is based on a reaction between poly-isocyanate component a) and hydroxyl functional component b).

Suitable poly-isocyanates for use as poly-isocyanate component a) in the composition include the known poly-isocyanates of polyurethane chemistry. Examples of suitable low molecular weight poly-isocyanates having a molecular weight of 168 to 300 include hexamethylene diisocyanate (HDI), 2,2,4- and/or 2,4,4-trimethyl-1,6-hexamethylene diisocyanate, dodecamethylene diisocyanate, 2,4-diisocyanato-1-methyl-benzene (toluene diisocyanate, TDI), 2,4-diisocyanato-1-methylbenzene,1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained in known manner by the phosgenation of aniline/formaldehyde condensates, 2,4- and/or 2,6-diisocyanatotoluene and any mixtures of these compounds.

In one embodiment, the one or more polyisocyanates are selected from aliphatic polyisocyanates, e.g. hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, and 2,4- and/or 4,4'-diisocyanato-diphenyl methane.

In some variants hereof, the coating composition also comprises one or more catalysts, e.g. one or more selected from tetramethylbutanediamine (TMBDA), N-alkyl morpholines, triethylamine (TEA), 1,8-diazabicyclo[5.4.0]undecene-7 (DBU), pentamethyldiethylene-triamine (PMDETA), zinc octoate, dioctyltin dilaurate dibutyltin dilaurate, and dibutyltin oxide, in particular from dioctyltin dilaurate dibutyltin dilaurate, and dibutyltin oxide. In other variants, the coating composition is devoid of any such catalysts.

In one embodiment, the one or more polyisocyanates are selected from aromatic polyisocyanates, e.g. 2,4-diisocyanato-1-methyl-benzene (toluene diisocyanate, TDI), 2,4-diisocyanato-1-methyl-benzene and mixtures of these isomers with their higher homologues which are obtained in known manner by the phosgenation of aniline/formaldehyde condensates, 2,4- and/or 2,6-diisocyanatotoluene and any mixtures of these compounds.

It is preferred, however, to use derivatives of these monomeric poly-isocyanates, as is conventional in coatings technology. These derivatives include poly-isocyanates containing biuret groups.

The modified poly-isocyanates are particularly preferred: N,N',N"-tris-(6-isocyanatohexyl)-biuret and mixtures thereof with its higher homologues and N,N',N"-tris-(6-isocyanatohexyl)-isocyanurate and mixtures thereof with its higher homologues containing more than one isocyanurate ring.

Examples of suitable commercially available poly-isocyanate resins are:
Desmodur N3900 (formerly VP2410), ex. Bayer (Germany), aliphatic polyisocyanate
Desmodur N3600, ex. Bayer (Germany), aliphatic polyisocyanate
Desmodur N3800, ex. Bayer (Germany), aliphatic polyisocyanate
Tolonate HDT-LV2, ex. Rhodia (France), aliphatic polyisocyanate
Desmodur N3390, ex. Bayer (Germany), aliphatic polyisocyanate
Tolonate HDT90, ex. Rhodia (France), aliphatic polyisocyanate
Basonat HI 190 B/S, ex. BASF (Germany), aliphatic polyisocyanate
Desmodur N75, ex. Bayer (Germany), aliphatic polyisocyanate
Bayhydur VP LS 2319, ex. Bayer (Germany), aliphatic polyisocyanate
Tolonate IDT 70B, ex. Rhodia (Frane), aliphatic polyisocyanate
Desmodur H, ex Bayer (Germany).
Basonat HB 175 MP/X BASF—Germany aliphatic polyisocyanate Examples of suitable commercially available aromatic polyisocyanate resins are:
Desmodur L67 BA (Bayer Material Science)
Desmodur E21 (Bayer Material Science)
Desmodur VL (Bayer Material Science)
Voratron EC 112 (Dow Chemicals)
Desmodur E23 (Bayer Material Science)
Desmodur E 1660 (Bayer Material Science)
Suprasec 2495 (Huntsman Advanced Materials).

Isocyanate group-containing prepolymers and semi-prepolymers based on the monomeric simple or modified poly-isocyanates exemplified above and organic polyhydroxyl compounds are also preferred for use as poly-isocyanate component a). These pre-polymers and semi pre-polymers generally have an isocyanate content of 0.5-30% by weight, preferably 1-20% by weight, and are prepared in known manner by the reaction of the above mentioned starting materials at an NCO/OH equivalent ratio of 1.05:1 to 10:1 preferably 1.1:1 to 3:1, this reaction being optionally followed by distillative removal of any un-reacted volatile starting poly-isocyanates still present.

The pre-polymers and semi pre-polymers may suitably be prepared from low molecular weight polyhydroxyl compounds having a molecular weight of 62 to 299, such as ethylene glycol, propylene glycol, trimethylol propane, 1,6-dihydroxy hexane; low molecular weight, hydroxyl-containing esters of these polyols with dicarboxylic acids of the type exemplified hereinafter; low molecular weight ethoxylation and/or propoxylation products of these polyols; and mixtures of the preceding polyvalent modified or unmodified alcohols.

The pre-polymers and semi pre-polymers are, however, preferably prepared from relatively high molecular weight polyhydroxyl compounds.

These polyhydroxyl compounds have at least two hydroxyl groups per molecule (and generally have a hydroxyl group content of 0.5-17% by weight, preferably 1-5% by weight.

Examples of suitable relatively high molecular weight polyhydroxyl compounds which may be used for the preparation of the pre-polymers and semi pre-polymers include the polyester polyols based on the previously described low molecular weight.

Examples of commercially available polyester polyols include:
Desmophen 651 MPA, ex. Bayer (Germany)
Desmophen VP LS 2089, ex. Bayer Material Science (Germany)

Polyether polyols, which are obtained in known manner by the alkoxylation of suitable starting molecules, are also suitable for the preparation of the isocyanate group-containing pre-polymers and semi pre-polymers. Examples of suitable starting molecules for the polyether polyols include the previously described monomeric polyols, water, and any mixtures of these starting molecules. Ethylene oxide and/or polylene oxide are particularly suitable alkylene oxides for the alkoxylation reaction. These alkylene oxides may be introduced into the alkoxylation reaction in any sequence or as a mixture.

Examples of commercial available polyether polyols include:
Desmophen 1380 BT 03/2008 (previously Desmophen 550 U), ex. Bayer Material Science (Germany)
Voranol CP 450 Polyol, ex. Dow Chemicals (Germany)

Also suitable for the preparation of the pre-polymers and semi pre-polymers are the hydroxyl group-containing polycarbonates which may be prepared by the reaction of the previously described monomeric diols with phosgene and diaryl carbonates such as diphenyl carbonate.

Component b) is based in whole or in part on organic polyhydroxyl compounds known from polyurethane chemistry and includes both the low molecular weight polyhydroxyl compounds and the relatively high molecular weight polyhydroxyl compounds previously set forth for the preparation of the pre-polymers and semi pre-polymers suitable for use as poly-isocyanate component a).

Particularly preferred hydroxyl functional, isocyanate-reactive, compounds which may be used as component b) are the hydroxy functional poly acrylates known for use in polyurethane coatings. These compounds are hydroxyl-containing copolymers of olefinically unsaturated compounds having a number average molecular weight (Mn) determined by vapour pressure or membrane osmometry of 800-50,000, preferably 1000-20,000 and more preferably 5000-10,000, and having a hydroxyl group content of 0.1-12% by weight, preferably 1-10% by weight and most preferably 2-6% by weight. The copolymers are based on olefinic monomers containing hydroxyl groups and olefinic monomers which are free from hydroxyl groups. Examples of suitable monomers include vinyl and vinylidene monomers such as styrene, α-methyl styrene, o- and p-chloro styrene, o-, m- and p-methyl styrene, p-tert. -butyl styrene; acrylic acid; (methy) acrylonitrile; acrylic and methacrylic acid esters of alcohols containing 1 to 8 carbon atoms such as ethyl acrylate, methyl acrylate, n- and isopropyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having 4 to 8 carbon atoms in the alcohol component; (methy)acrylic acid amide; vinyl esters of alkane monocarboxylic acids having 2 to 5 carbon atoms such as vinyl acetate or vinyl propionate; and hydroxyalkyl esters of acrylic acid or methacrylic acid having 2 to 4 carbon atoms in the hydroxyalkyl group such as 2-hydroxyethyl-, 2, hydroxypropyl-, 4-hydroxybutyl-acrylate and methacrylate and trimethylol propane-mono- or pentaerythritomono-acrylate or methyacrylate. Mixtures of the monomers exemplified above may also be used for the preparation of the hydroxy functional poly acrylates. Mixtures of the polyhydroxyl compounds previously described may be used as component b).

In this type of the polyurethane based binder system, components a) and b) are used in amounts sufficient to provide an equivalent ratio of isocyanate groups to isocyanate-reactive (hydroxyl) groups of 0.8:1 to 20:1, preferably 0.8:1 to 2:1, more preferably 0.8:1 to 1.5:1, even more preferably 0.8:1 to 1.2:1 and most preferably about 1:1. The hydroxyl functional compound b) is present in an amount such that up to 20 hydroxyl groups are present; preferably the equivalent ratio of hydroxyl groups to secondary amino groups is 10:1 to 1:10.

Examples of suitable commercially available hydroxyl functional (isocyanate-reactive) resins include:
Synocure 878 N 60, ex. Arkem (Spain), hydroxyl functional acrylic resin in aromatic hydrocarbon.
Synthalat A 0 77, ex. Synthopol Chemie (Germany)
Synthalat A 045, ex. Synthopol Chemie (Germany)
Synthalat A 088 MS, ex. Synthopol Chemie (Germany)
Synthalat A 141 HS 05, ex. Synthopol Chemie (Germany)
Synthalat A 060, ex. Synthopol Chemie (Germany)
Desmophen A XP 2412, ex. Bayer Material Science (Germany)
Synthalat A-TS 1603, ex. Synthopol Chemie (Germany)
Acrylamac 332-2629, ex. Momentive (Germany)

A polyurethane coating system of the type described above is typically supplied as a two-component system, where one package comprise the hydroxyl-containing component(s), any pigments, solvents and additives and another package comprise the polyisocyanate-containing compound and moisture free solvents. Zinc particles, conductive pigment(s) and hollow glass microspheres are typically added to the hydroxyl containing package. An example of such a coating is provided in Table 9.

Another type of polyurethane coating systems is a one-component system, where all components are supplied in the same container and the paint is moisture-cured (typically at ambient temperature and ambient conditions or under slightly increased temperatures e.g. 60-100°, optionally with the presence of an accelerator e.g. a tin comprising accelerator. An example of such a coating is provided in Table 8.

In one embodiment the moisture cured polyurethane-based binder system contains one or more isocyanate pre-polymers e.g. polyisocyanate prepolymer based on toluene diisocyanate (TDI).

Examples of suitable commercially available isocyanate prepolymers include:
Desmodur E21 (Bayer Material Science)
Desmodur E1361 (Bayer Material Science)
Desmodur E14 (Bayer Material Science)
Desmodur E23 (Bayer Material Science)
Desmodur E 1660 (Bayer Material Science)
Voratron EC 112 (Dow Chemicals)

A polyurethane coating system of the type described above is typically supplied as a one-component system, where the package comprise the one or more isocyanate prepolymers, conductive pigment(s), zinc particles, hollow glass microspheres and any non-conductive pigments, fillers, solvents, additives etc.

The Zinc Particles

The material referred to as "zinc particles" is a particulate material with a high content of zinc, such as at least 90% by weight of zinc.

The term "particulate material" is intended to cover both fine spherical or somewhat irregularly shaped particles and other shapes such as flakes, discs, spheres, needles, platelets, fibres and rods. The particulate material may be a powder or a dust.

The particle size distribution of the particulate material is of some importance in painting applications. For example too coarse particulate materials would result in particles sticking through the dry paint film. Therefore, in one embodiment, particulate materials with a $D_{50}$ (mean particle size) of less than 50 µm is used. In a further embodiment, a $D_{50}$ of less than 20 µm is used, in yet a further embodiment, a $D_{50}$ of less than 15 µm is used, and in a still further embodiment a $D_{50}$ of less than 12 µm is used.

In addition to the remarks above, particles coarser than 100 µm should be avoided as much as possible, as they may stick out of the paint film. This would lead to defects in the paint film and deteriorate the barrier effect and the anti-corrosion properties. Therefore it is useful to discard, e.g. by sieving, any particles larger than 100 µm. In practice, a $D_{99}$ of less than 100 µm is deemed to be adequate The particle size distribution of the materials may e.g. be measured using a Helos® Sympatec GmbH laser diffraction apparatus. The parameters $D_{50}$ and $D_{99}$ are equivalent particle diameters for which the volume cumulative distribution, Q3, assumes values of respectively 50 and 99%.

The particulate materials can be manufactured by classic gas atomization of a corresponding coarse zinc material. As the particulate materials directly obtained from such a process still include coarse particles, which are incompatible with the envisaged application, a sieving or a classifying operation has to be performed.

The zinc particles comprised in the present invention may also be directly obtained commercially. Suppliers include Purity Zinc Metals, Horsehead Corporation, Umicore, US Zinc, Jiashan Baiwei, and Garrison Minerals, among many others, e.g. ZMP 4P16, Umicore (Belgium).

The zinc particles are in one embodiment present in the coating composition of the present invention in an amount of about 10 to 55% by solids volume, such as in the amount of about 15 to 50% by solids volume, e.g. in the amount of about 18 to 40% by solids volume, more particularly in the amount of about 20 to about 36% by solids volume, even more particularly in the amount of about 20 to about 30% by solids volume of the mixed coating composition. In another embodiment, the zinc particles are present in the coating composition of the present invention in an amount of about 30 to 50% by solids volume, such as in the amount of 35 to 45% by solids volume of the mixed coating composition.

Hollow Class Microspheres

Non-coated hollow glass microspheres may be purchased commercially. Suppliers include 3M Corporation, Minerals i Derivats S.A., and Potter Industries.

Potter Industries sells their hollow glass microspheres under the trademark SPHERICEL®. SPHERICEL® are available in various sizes, entitled 110P8, 60P18, 45P25, 34P30, and 25P45. The 110P8 microspheres are slightly heavier than water (in terms of specific gravity) and have a true density of 1.1 g/ml, whereas the densities of 60P18, 45P25, 34P30, and 25P45 are 0.60, 0.45, 0.34, and 0.25 g/ml, respectively. They have a maximum working pressure of 10,000, 8,000, 4,000, 3,000, and 750 psi, respectively.

The microspheres supplied by Minerals i Derivats S.A. (produced by Larand Chem Corp, US) under the name ESFERIGLASS-U6 are spherical, white, ultra low density glass spheres with a true density of 0.224 g/cc, a bulk density of 0.16 g/cc and an oil absorption of 38 g/100 cc. The particle size of these microspheres are such that 10% are smaller than 15 μm, 50% are smaller than 25 μm, and 90% are smaller than 40 μm.

Coated hollow glass microspheres may be prepared from the non-coated hollow glass microspheres according to the method disclosed in U.S. Pat. No. 4,621,024. However, in a presently preferred embodiment of the invention, the hollow glass microspheres comprised in the coating composition of the invention are non-coated.

The density of the hollow glass microspheres may influence the performance of the coating composition. Thus, in a presently preferred embodiment, the true density of the hollow glass microspheres is about 0.05 to 0.75, e.g. 0.1 to 0.5, such as about 0.2 to 0.4 g/cc.

In a further embodiment of the coating composition of the present invention the hollow glass microspheres are non-coated and have a true density of about 0.05 to 0.75, e.g. 0.1 to 0.5, such as about 0.2 to 0.4 g/cc.

In yet a further embodiment of the coating composition of the present invention, the hollow glass microspheres have a particle size such that 90% have a diameter of less than 120 μm, such as less than 100 μm, e.g. less than 60 μm, more particularly less than 50 μm.

In yet a further embodiment of the coating composition of the present invention the hollow glass microspheres have an average particle size such that 50% have a diameter of less than 80 μm, such as less than 70 μm, e.g. less than 60 μm or less than 50 μm, more particularly less than 45.

The hollow glass microspheres are present in the coating composition of the present invention in an amount suitable to achieve improved corrosion resistance. Thus, in one embodiment, the hollow glass microspheres are present in an amount of between about 10 and 30% by solids volume of the mixed paint composition, such as between 15 and 25% by solids volume, e.g. between 18 and 24% by solids volume. In another embodiment, the hollow glass microspheres are non-coated and are present in an amount of between about 10 and 30% by solids volume, such as between 15 and 25% by solids volume, e.g. between 18 and 24% by solids volume. In yet another embodiment, the hollow glass microspheres are non-coated, are present in an amount of between about 10 and 30% by solids volume, such as between 15 and 25% by solids volume, e.g. between 18 and 24% by solids volume, and 90% have a diameter of less than 120 μm, such as less than 100 μm, e.g. less than 60 μm, more particularly less than 50 μm. More specifically, in this further embodiment the hollow glass microspheres are non-coated, are present in an amount of between about 10 and 30% by solids volume, and 90% have a diameter of less than 120 μm; the hollow glass microspheres are non-coated, are present in an amount of between about 10 and 30% by solids volume, and 90% have a diameter of less than 100 μm; the hollow glass microspheres are non-coated, are present in an amount of between about 10 and 30% by solids volume, and 90% have a diameter of less than 60 μm; the hollow glass microspheres are non-coated, are present in an amount of between about and 30% by solids volume, and 90% have a diameter of less than 50 μm; the hollow glass microspheres are non-coated, are present in an amount of between about 15 and 25% by solids volume, and 90% have a diameter of less than 120 μm; the hollow glass microspheres are non-coated, are present in an amount of between about 15 and 25% by solids volume, and 90% have a diameter of less than 100 μm; the hollow glass microspheres are non-coated, are present in an amount of between about 15 and 25% by solids volume, and 90% have a diameter of less than 60 μm; the hollow glass microspheres are non-coated, are present in an amount of between about 15 and 25% by solids volume, and 90% have a diameter of less than 50 μm; the hollow glass microspheres are non-coated, are present in an amount of between about 18 and 24% by solids volume, and 90% have a diameter of less than 120 μm; the hollow glass microspheres are non-coated, are present in an amount of between about 18 and 24% by solids volume, and 90% have a diameter of less than 100 μm; the hollow glass microspheres are non-coated, are present in an amount of between about 18 and 24% by solids volume, and 90% have a diameter of less than 60 μm; the hollow glass microspheres are non-coated, are present in an amount of between about 18 and 24% by solids volume, and 90% have a diameter of less than 50 μm.

In a further embodiment, the hollow glass microspheres are present in an amount of less than 5.9% by weight of the composition, such as less than 5.5% by weight, e.g. in the range 0.1 to 5.0% by weight, 0.2 to 4.5% by weight, 0.5 to 4.0% by weight, or 1.0 to 3.0% by weight of the composition.

In a presently preferred embodiment the hollow glass microspheres are not added to the remaining components until after any final grinding.

Conductive Pigments

The conductive pigment comprised in the coating composition of the present invention may be selected from the group consisting of graphite, carbon black, aluminium pigments, black iron oxide, antimony-doped tin oxide, indium tin oxide, mica coated with antimony-doped tin oxide, carbon nanotubes, carbon fibres, graphene, and any mixture thereof. In one embodiment, the conductive pigment is selected from graphite, carbon black, aluminium pigments, antimony-doped tin oxide, carbon nanotubes, carbon black, and any mixture thereof. In a further embodiment, the conductive pigment is selected from graphite, carbon black, carbon nanotubes and any mixture thereof. In another embodiment, the conductive pigment is graphite. In yet another embodiment, the conductive pigment is carbon black.

In the context of the present invention, when referring to "graphite", the term is used in the sense that it may still be recognized by the skilled person as graphite per se and not as somehow being incorporated into other materials, in particular zinc, by chemical bonding or otherwise.

In the coating composition of the present invention, the conductive pigment, such as graphite or carbon black, graphite currently being more preferred, is in one embodiment present in an amount of between about 0.5 to 5.0% by solids volume, such as about 0.5 to 4.0% by solids volume, e.g. about 1.0 to 3.0% by solids volume, more particularly about 1.5 to 2.5% by solids volume of the coating composition.

In a further embodiment, the coating composition of the invention comprises graphite in an amount of less than 4% by weight of the total composition, such as about 0.1 to 3.8% by weight of the total compositions, e.g. 0.5 to 3.5% by weight of the total composition.

The conductive pigments comprised in the present invention may be directly obtained commercially.

Examples of suitable conductive pigments are:
Graphit AF96/97 Graphitwerk Kropfmühl AG—Germany (graphite)
Cond 8/96, Graphite Týn, spol, s.r.o.—Czech Republic (micronized graphite)
DonaCarbo S-241, Osaka Gas Chemicals Co, Ltd—Japan (carbon fibre)
Minatec 40 cm, Merck KGaA—Germany (mica coated with antimony-doped tin oxide
Raven 1000, ex. Columbian Carbon—USA (carbon black)
Carbon black Powercarbon 4300F, ex. Yongfeng Chemicals—China
Lamp Black 103, ex. Degussa AG—Germany (carbon black)
Special Black 1000, ex. Orion Engineered Carbons GmbH—Germany (carbon black)
Other Constituents The paint composition may comprise plasticizers. Examples of plasticizers are hydrocarbon resins, phthalates and benzyl alcohol. In one embodiment the paint composition comprises a hydrocarbon resin as plasticizer.

The paint composition may comprise other paint constituents as will be apparent for the person skilled in the art. Examples of such paint constituents are non-conductive pigments e.g. $TiO_2$, yellow or red iron oxides, cobalt blue, bismuth vanadates and organic pigments; fillers, e.g. Al/K/Na silicates (e.g. Silicato MN/SA 15 12/2009. Minerals I Derivats S.A., Spain), talc, mica, and $BaSO_4$; additives (e.g. wetting agents, dispersing agents, scavengers, rheologic agents, thickening agents, de-foaming agents, and thixotropic agents (such as bentonites)).

In the paint composition, the total amount of fillers and non-conductive pigments may be in the range of 0-50%, such as 0-40%, 0-30% or 0-25% by solids volume of the mixed paint composition. In the alternative, the total amount of fillers and non-conductive pigments may be in the range 5-40% by solids volume, such as in the range 10-35% by solids volume.

In the paint composition, the total amount of additives may be in the range of 0-10%, such as 0.1-8% by solids volume of the mixed paint composition.

In one embodiment, the coating composition of the invention contains less than 10% by weight of the filler modified $CaSiO_3$, also known as "Wollastonite".

In another embodiment, the paint composition comprises one or more additives selected from the group of wetting agents and dispersing agents. Wetting agents and dispersing agents help in achieving a homogeneous dispersion of the particulate zinc material. Examples of suitable wetting agents and dispersing agents are:
Cargill Lecikote 20 ex. Cargill Foods (Belgium)
Lipotin 100 ex. Degussa Texturant Systems (Germany)
Nuosperse 657 ex. Elementis Specialities (The Netherlands)
Anti Terra U ex. BYK Chemie (Germany)
Disperbyk 164 ex. BYK Chemie (Germany)
Anti Terra 204 ex. BYK Chemie (Germany)

The paint composition may comprise epoxy accelerators. Examples are substituted phenols such as 2,4,6-tris (dimethylamino methyl) phenol, p-tert. Butylphenol, nonyl phenol etc., or salicylic acid. Examples include Ancamine K54 from Air Products Plc. (UK). Epoxy accelerators may be included in an amount of 0 to 7% by solids volume, such as about 0.5 to 6% by solids volume, e.g. about 1 to 5% by solids volume, more specifically about 2 to 4% by solids volume.

Examples of suitable epoxy modifiers comprise e.g. oils, oil derivatives, modified oils such as linseed oil and derivatives thereof, castor oil and derivatives thereof, soy bean oil and derivatives thereof.

The paint composition may also comprise reactive epoxy diluents, such as diluents from the classes of mono functional glycidyl ethers of aliphatic, cycloaliphatic or aromatic compounds. Examples include Cardolite NC 513 from Cardanol Chemicals (US), Araldite DY-E/BD, ex. Huntsman Advanced Materials—Germany, and Cardura E10P ex. Momentive—Netherlands. Epoxy diluents may be included in an amount of 0 to 9% by solids volume, such as about 2.5 to 8% by solides volume, e.g. about 3 to 7% by solids volume, more particularly about 4 to 6% by solids volume.

The paint composition may also comprise epoxy flexibilizers.

The paint composition typically comprises a solvent or solvents. Examples of solvents are water; alcohols, such as methanol, ethanol, propanol, isopropanol, butanol, isobutanol or benzyl alcohol; alcohol/water mixtures, such as ethanol/water mixtures; aliphatic, cycloaliphatic and aromatic hydrocarbons, such as white spirit, cyclohexane, toluene, xylene and naphtha solvent; ketones, such as methyl ethyl ketone, acetone, methyl isobutyl ketone, methyl isoamyl ketone, diacetone alcohol and cyclohexanone; ether alcohols, such as 2-butoxyethanol, propylene glycol monomethyl ether and butyl diglycol; esters, such as methoxypropyl acetate, n-butyl acetate and 2-ethoxyethyl acetate; and mixtures thereof.

Depending on the application technique, it is desirable that the paint comprises solvent(s) so that the solids volume ratio (SVR—ratio between the volume of solid constituents to the total volume)—also termed SV %—is in the range of 30-100%, such as 50-100%, in particular 55-100% e.g. 60-100%.

SVR is determined according to ISO 3233 or ASTM D 2697 with the modification that drying is carried out at 20° C. and 60% relative humidity for 7 days instead of drying at higher temperatures.

Kit of Parts

As mentioned above, the binder system comprised in the coating composition of the invention, epoxy-based or otherwise, may contain one or more curing agents. The skilled person will recognize that the curing agent may advantageously be mixed with the remaining components of the binder system, e.g. an epoxy resin, in situ shortly before being applied. Said remaining components of the binder system are often referred to as the "base component" and in the context of the present invention the term "base component" is intended to mean the components of the binder system other than the one or more curing agents.

Hence, another aspect of the invention concerns a kit of parts containing a coating composition as defined herein comprising two or more containers, wherein one container contains one or more curing agents and another container contains the base component.

The components of the coating composition of the invention as defined herein other than the binder system and curing agent may be contained in either of the two containers of the kit of parts or, possibly, in one or more further containers. Typically, said components will be present in the container containing said base component. Thus, in one embodiment, the components of the coating composition of the invention other than the curing agent are contained in the container containing the base component.

In a particular embodiment of the kit of parts according to the present invention, a polysiloxane modified binder system comprises an epoxy resin part and an amino-functional polysiloxane and polysiloxane (modified) binder part, which are kept in two separate containers and mixed right before use. Thus, in one embodiment the conductive pigment and the hollow glass microspheres are added to the epoxy resin part whereas the zinc particles are added to the polysiloxane resin containing part.

Specific Embodiments

For each of the components a), b), c), and d) as disclosed herein for the paint composition of the invention a number of specific embodiments have been disclosed. It is seriously contemplated to combine each of said specific embodiments for component a) with each of said specific embodiments for component b), each of said specific embodiments for component c), and each of said specific embodiments for component d).

More specifically, one embodiment of the invention concerns a coating composition comprising:
a) an epoxy-based binder system,
b) zinc particles with a $D_{50}$ of less than 20 µm present in an amount of about 10 to 55% by solids volume,
c) non-coated hollow glass microspheres present in an amount of between about 10 and 30% by solids volume, and 90% having a diameter of less than 50 µm, and
d) a conductive pigment selected from the group consisting of graphite, carbon black, carbon nanotubes, and any mixture thereof.

Another embodiment of the invention concerns a coating composition comprising:
a) an epoxy-based binder system,
b) zinc particles with a $D_{50}$ of less than 20 µm present in an amount of about 10 to 55% by solids volume,
c) non-coated hollow glass microspheres present in an amount of between about 10 and 30% by solids volume, and 90% having a diameter of less than 50 µm, and
d) graphite.

Still another embodiment of the invention concerns a coating composition comprising:
a) an epoxy-based binder system,
b) zinc particles with a $D_{50}$ of less than 20 µm present in an amount of about 10 to 55% by solids volume,
c) non-coated hollow glass microspheres present in an amount of between about 10 and 30% by solids volume, and 90% having a diameter of less than 120 µm, and
d) a conductive pigment selected from the group consisting of graphite, carbon black, carbon nanotubes, and any mixture thereof.

Yet another embodiment of the invention concerns a coating composition comprising:
a) an epoxy-based binder system,
b) zinc particles with a $D_{50}$ of less than 20 µm present in an amount of about 10 to 55% by solids volume,
c) non-coated hollow glass microspheres present in an amount of between about 10 and 30% by solids volume, and 90% having a diameter of less than 120 µm, and
d) graphite.

An additional embodiment of the invention concerns a coating composition comprising:
a) an epoxy-based binder system,
b) zinc particles with a $D_{50}$ of less than 20 µm present in an amount of about 18 to 40% by solids volume,
c) non-coated hollow glass microspheres present in an amount of between about 10 and 30% by solids volume, and 90% having a diameter of less than 50 µm, and
d) a conductive pigment selected from the group consisting of graphite, carbon black, carbon nanotubes, and any mixture thereof.

A further embodiment of the invention concerns a coating composition comprising:
a) an epoxy-based binder system,
b) zinc particles with a $D_{50}$ of less than 20 µm present in an amount of about 18 to 40% by solids volume,
c) non-coated hollow glass microspheres present in an amount of between about 10 and 30% by solids volume, and 90% having a diameter of less than 50 µm, and
d) graphite.

Still a further embodiment of the invention concerns a coating composition comprising:
a) an epoxy-based binder system,
b) zinc particles with a $D_{50}$ of less than 20 µm present in an amount of about 18 to 40% by solids volume,
c) non-coated hollow glass microspheres present in an amount of between about 10 and 30% by solids volume, and 90% having a diameter of less than 120 µm, and
d) a conductive pigment selected from the group consisting of graphite, carbon black, carbon nanotubes, and any mixture thereof.

Yet a further embodiment of the invention concerns a coating composition comprising:
a) an epoxy-based binder system,
b) zinc particles with a $D_{50}$ of less than 20 µm present in an amount of about 18 to 40% by solids volume,
c) non-coated hollow glass microspheres present in an amount of between about 10 and 30% by solids volume, and 90% having a diameter of less than 120 µm, and
d) graphite.

The specific embodiments may also comprise polysiloxane-based binder systems. Hence, one embodiment of the invention concerns a coating composition comprising:
a) a polysiloxane-based binder system,
b) zinc particles with a $D_{50}$ of less than 20 µm present in an amount of about 10 to 55% by solids volume, c) non-coated hollow glass microspheres present in an amount of between about 10 and 30% by solids volume, and 90% having a diameter of less than 50 μm, and d) a conductive pigment selected from the group consisting of graphite, carbon black, carbon nanotubes, and any mixture thereof.

Another embodiment of the invention concerns a coating composition comprising:
a) a polysiloxane-based binder system,
b) zinc particles with a $D_{50}$ of less than 20 μm present in an amount of about 10 to 55% by solids volume,
c) non-coated hollow glass microspheres present in an amount of between about 10 and 30% by solids volume, and 90% having a diameter of less than 50 μm, and
d) graphite.

Still another embodiment of the invention concerns a coating composition comprising:
a) a polysiloxane-based binder system,
b) zinc particles with a $D_{50}$ of less than 20 μm present in an amount of about 10 to 55% by solids volume,
c) non-coated hollow glass microspheres present in an amount of between about 10 and 30% by solids volume, and 90% having a diameter of less than 120 μm, and
d) a conductive pigment selected from the group consisting of graphite, carbon black, carbon nanotubes, and any mixture thereof.

Yet another embodiment of the invention concerns a coating composition comprising:
a) a polysiloxane-based binder system,
b) zinc particles with a $D_{50}$ of less than 20 μm present in an amount of about 10 to 55% by solids volume,
c) non-coated hollow glass microspheres present in an amount of between about 10 and 30% by solids volume, and 90% having a diameter of less than 120 μm, and
d) graphite.

An additional embodiment of the invention concerns a coating composition comprising:
a) a polysiloxane-based binder system,
b) zinc particles with a $D_{50}$ of less than 20 μm present in an amount of about 18 to 40% by solids volume,
c) non-coated hollow glass microspheres present in an amount of between about 10 and 30% by solids volume, and 90% having a diameter of less than 50 μm, and
d) a conductive pigment selected from the group consisting of graphite, carbon black, carbon nanotubes, and any mixture thereof.

A further embodiment of the invention concerns a coating composition comprising:
a) a polysiloxane-based binder system,
b) zinc particles with a $D_{50}$ of less than 20 μm present in an amount of about 18 to 40% by solids volume,
c) non-coated hollow glass microspheres present in an amount of between about 10 and 30% by solids volume, and 90% having a diameter of less than 50 μm, and
d) graphite.

Still a further embodiment of the invention concerns a coating composition comprising:
a) a polysiloxane-based binder system,
b) zinc particles with a $D_{50}$ of less than 20 μm present in an amount of about 18 to 40% by solids volume,
c) non-coated hollow glass microspheres present in an amount of between about 10 and 30% by solids volume, and 90% having a diameter of less than 120 μm, and
d) a conductive pigment selected from the group consisting of graphite, carbon black, carbon nanotubes, and any mixture thereof.

Yet a further embodiment of the invention concerns a coating composition comprising:
a) a polysiloxane-based binder system,
b) zinc particles with a $D_{50}$ of less than 20 μm present in an amount of about 18 to 40% by solids volume,
c) non-coated hollow glass microspheres present in an amount of between about 10 and 30% by solids volume, and 90% having a diameter of less than 120 μm, and
d) graphite.

The specific embodiments may also comprise polyurethane-based binder systems. Hence, one embodiment of the invention concerns a coating composition comprising:
a) a polyurethane-based binder system,
b) zinc particles with a $D_{50}$ of less than 20 μm present in an amount of about 10 to 55% by solids volume,
c) non-coated hollow glass microspheres present in an amount of between about 10 and 30% by solids volume, and 90% having a diameter of less than 50 μm, and
d) a conductive pigment selected from the group consisting of graphite, carbon black, carbon nanotubes, and any mixture thereof.

Another embodiment of the invention concerns a coating composition comprising:
a) a polyurethane-based binder system,
b) zinc particles with a $D_{50}$ of less than 20 μm present in an amount of about 10 to 55% by solids volume,
c) non-coated hollow glass microspheres present in an amount of between about 0.2 to 4.5% by weight, and 90% having a diameter of less than 50 μm, and
d) graphite.

Still another embodiment of the invention concerns a coating composition comprising:
a) a polyurethane-based binder system,
b) zinc particles with a $D_{50}$ of less than 20 μm present in an amount of about 10 to 55% by solids volume,
c) non-coated hollow glass microspheres present in an amount of between about 0.2 to 4.5% by weight, and 90% having a diameter of less than 120 μm, and
d) a conductive pigment selected from the group consisting of graphite, carbon black, carbon nanotubes, and any mixture thereof.

Yet another embodiment of the invention concerns a coating composition comprising:
a) a polyurethane-based binder system,
b) zinc particles with a $D_{50}$ of less than 20 μm present in an amount of about 10 to 55% by solids volume,
c) non-coated hollow glass microspheres present in an amount of between about 0.2 to 4.5% by weight, and 90% having a diameter of less than 120 μm, and
d) graphite.

An additional embodiment of the invention concerns a coating composition comprising:
a) a polyurethane-based binder system,
b) zinc particles with a $D_{50}$ of less than 20 μm present in an amount of about 18 to 40% by solids volume,
c) non-coated hollow glass microspheres present in an amount of between about 0.2 to 4.5% by weight, and 90% having a diameter of less than 50 μm, and d) a conductive pigment selected from the group consisting of graphite, carbon black, carbon nanotubes, and any mixture thereof.

A further embodiment of the invention concerns a coating composition comprising:
a) a polyurethane-based binder system,
b) zinc particles with a $D_{50}$ of less than 20 µm present in an amount of about 18 to 40% by solids volume,
c) non-coated hollow glass microspheres present in an amount of between about 0.2 to 4.5% by weight, and 90% having a diameter of less than 50 µm, and
d) graphite.

Still a further embodiment of the invention concerns a coating composition comprising:
a) a polyurethane-based binder system,
b) zinc particles with a $D_{50}$ of less than 20 µm present in an amount of about 18 to 40% by solids volume,
c) non-coated hollow glass microspheres present in an amount of between about 0.2 to 4.5% by weight, and 90% having a diameter of less than 120 µm, and
d) a conductive pigment selected from the group consisting of graphite, carbon black, carbon nanotubes, and any mixture thereof.

Yet a further embodiment of the invention concerns a coating composition comprising:
a) a polyurethane-based binder system,
b) zinc particles with a $D_{50}$ of less than 20 µm present in an amount of about 18 to 40% by solids volume,
c) non-coated hollow glass microspheres present in an amount of between about 0.2 to 4.5% by weight, and 90% having a diameter of less than 120 µm, and
d) graphite.

Coating Systems

The term "applying" is used in its normal meaning within the paint industry. Thus, "applying" is conducted by means of any conventional means, e.g. by brush, by roller, by air-less spraying, by air-spray, by dipping, etc. The commercially most interesting way of "applying" the coating composition is by spraying. Spraying is effected by means of conventional spraying equipment known to the person skilled in the art. The coating is typically applied in a dry film thickness of 5-300 µm, such as 5125 µm or 25-300 µm.

In a particular embodiment of the invention, an outer coating composition is subsequently applied onto said zinc-containing coat. The outer coating is typically of a coating composition selected from epoxy-based coating compositions, polyurethane-based coating compositions, acrylic-based coating compositions, polyurea-based coating composition, polysiloxane-based coating compositions and fluoro polymer-based coating compositions. Moreover, the outer coating is typically applied in a dry film thickness of 30-300 µm, such as 30-200 µm or 35-300 µm.

In a particular variant hereof, an intermediate coating composition is first subsequently applied onto said zinc-containing coat, whereafter the outer coating is applied onto the outer coat. The intermediate coating is typically of a coating composition selected from epoxy-based coating compositions, acrylic-based coating compositions, and polyurethane-based coating compositions. Moreover, the intermediate coating is typically applied in a dry film thickness of 50-200 µm. In one embodiment, a first epoxy-based coating according to the present invention is applied, followed by an outer coating containing polyurethane-based resin.

Hence, the present invention also provides a coated structure comprising a metal structure having a first coating of the zinc-containing coating composition defined herein applied onto at least a part of the metal structure in a dry film thickness of 5-100 µm or 5-300 µm, such as 25-300 µm; and an outer coating applied onto said zinc-containing coating in a dry film thickness of 30-300 µm, such as 30-200 µm. Preferably, the outer coating is of a coating composition selected from epoxy-based coating compositions, polyurethane-based coating compositions, acrylic-based coating compositions, polyurea-based coating composition, polysiloxane-based coating compositions and fluoro polymer-based coating compositions.

In an interesting variant hereof, an intermediate coating has been applied onto said zinc-containing coating in a dry film thickness of 50-200 µm before application of the outer coating composition. Preferably, the intermediate coating is of a coating composition selected from epoxy-based coating compositions, acrylic-based coating compositions, and polyurethane-based coating compositions.

The structure is typically selected from fixed or floating offshore equipment, e.g. for the oil and gas industry such as oil rigs, bridges, containers, refineries, petrochemical industry, power-plants, storage tanks, cranes, windmills, steel structures part of civil structures e.g. airports, stadia and tall buildings.

The structure is of a metal, in particular steel.

Preparation of the Paint Composition

The paint may be prepared by any suitable technique that is commonly used within the field of paint production. Thus, the various constituents may be mixed together using a high speed disperser, a ball mill, a pearl mill, a three-roll mill etc. The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), or by vibration filtration.

Typically, the solid components of the paint composition are mixed and ground. However, the hollow glass microspheres are advantageously not included until after the grinding has taken place. Thus, in one embodiment, the hollow glass microspheres are included in the paint composition of the invention after any grinding of the remaining paint components. In a further embodiment, the invention comprises a paint composition obtainable by including the hollow glass microspheres after any grinding of the remaining paint components.

The paint composition may be prepared as a one component paint or by mixing two or more components e.g. two pre-mixtures, one pre-mixture comprising the one or more resins and one pre-mixture comprising the one or more curing agents. Or as a three component system where one pre-mixture comprises the one or more resins, and one pre-mixture comprises the one or more curing agents and a third container comprises the zinc particles.

The hollow glass microspheres and the conductive pigment may be added, together or separately, to any of the components in a paint composition prepared from two or more components.

It should be understood that when reference is made to the paint composition, it is the mixed paint composition. Furthermore all amounts stated as % by solids volume of the paint should be understood as % by solids volume of the mixed paint composition unless stated otherwise.

EXAMPLES

Example 1

Preparation of Test Panels

Steel panels are coated with 1×70 μm of the paint to be tested. The steel panels (10×15 cm×1.6 mm) are cold rolled mild steel, abrasive blasted to Sa 3 (ISO 8501-1), with a surface profile equivalent to BN 9 (Rugotest No. 3). After the samples have been coated the panels are conditioned at a temperature of 23±2° C. and 50±5% relative humidity for a period of 7 days.

Salt Spray Test, According to ISO 9227, Neutral Salt Spray.

This method is performed in order to evaluate the corrosion resistance of a coating system by reproducing the corrosion that occurs in atmosphere containing salt spray or splash.

The operation conditions of the salt spray test are constant spray with 5% NaCl solution at 35° C.

After ending of the exposure, blistering and rust are evaluated on both panel and around the score (in mm from centre), according to ISO 4628-2 and ISO 4628-3, respectively. Cracking is evaluated according to ISO 4628-4.

Adhesion is evaluated according ISO 4624 (pull-off tests).

After removing the coating at a score by a suitable method (mechanical or chemical cleaning), the width of the corrosion is measured at nine points. The rust creep M is calculated from the equation $M=(C-W)/2$, where C is the average of the nine width measurements and W is the original width of the scribe (0.5 mm).

Preparation of Coating Compositions

Component 1 was prepared in the following way:

The epoxy resin(s), filler, wetting agent, dispersing agent, scavenger, rheologic and thickening agent and 60% of the solvents (xylene:n-butanol 3:1 wt) were premixed on a high speed mixer equipped with an impeller disc (90 mm in diameter) in a 2.5 litre can for 15 minutes at 1000 rpm. The zinc particles were then added and mixed for about 15 minutes at 2000 rpm. Microspheres were added under slow stirring together with 30% of the solvents. The remaining 10% of solvent was then added.

Component 2 was prepared in the following way:

The polyaminoamide and reactive epoxy diluent were mixed with 50% solvent. After minimum 16 hours the epoxy accelerator, filler, graphite, defoamer, thixotropic agent were premixed on a high speed mixer equipped with an impeller disc (90 mm in diameter) in a 2.5 litre can for 15 minutes at 1000 rpm. Then benzyl alcohol and the remaining 50% of solvent were mixed.

Just before the application, component 2 was added to component 1 and the paint composition was mixed to a homogenous mixture.

TABLE 1

Basic formulation of epoxy-based paints

| Table 1 | Model paint A % SV | Model paint B % SV | Model paint C % SV | Model paint D % SV | Model paint E % SV | Model paint F % SV | Model paint G % SV |
|---|---|---|---|---|---|---|---|
| Component 1: Epoxy functional compound | | | | | | | |
| Epoxy resin (Bisphenol A glycidylether epoxy binder, Araldite GZ 7071X75CH, ex. Huntsman Advanced Materials - Switzerland) | 17 | 17 | 17 | 17 | 16 | 24 | 24 |
| Epoxy resin (Bisphenol A-epichlorydrin, Araldite DY-E/BD, ex. Huntsman Advanced Materials - Germany | 8 | 8 | 8 | 8 | 8 | 4 | 4 |
| Zinc particles, ZMP 4P16, Umicore-Belgium | 22 | 22 | 22 | 22 | 34 | 34 | 43 |
| Nepheline syenite, Al/K/Na silicate, filler - Silicato MN/SA 15 12/2009, Minerals i Derivats S.A. - Spain | 11 | 32 | 13 | 34 | | 3 | 3 |
| Additives[1] | 3 | 3 | 3 | 3 | 3 | 4 | 4 |
| Solvents: | | | | | | | |
| Xylene | | | | | | | |
| Butanol | | | | | | | |
| Non-coated Aluminosilicate glass spheres (Esferiglass-U6, Minerals I Derivats S.A. - Spain | 21 | | 21 | | 23 | 9 | |
| Total component 1: | 82 | 82 | 84 | 84 | 84 | 78 | 78 |
| Component 2: | | | | | | | |
| Polyaminoamide (Crayamid 140, Arkema - Italy | 8 | 8 | 8 | 8 | 8 | 13 | 13 |
| Reactive epoxy diluent (Cardolite NC 513, Cardanol Chemicals - US) | 5 | 5 | 5 | 5 | 4 | 5 | 5 |
| Epoxy accelerator (ancamine K54, Air Products Plc - UK | 3 | 3 | 3 | 3 | 2 | 3 | 3 |
| Macrocrystalline graphite, Graphit AF 96/97, Graphitwerk Kropfmuhl AG - | 2 | 2 | | | 2 | | |

TABLE 1-continued

| Basic formulation of epoxy-based paints | | | | | | | |
|---|---|---|---|---|---|---|---|
| Table 1 | Model paint A % SV | Model paint B % SV | Model paint C % SV | Model paint D % SV | Model paint E % SV | Model paint F % SV | Model paint G % SV |
| Germany Additives[2)] Benzyl alcohol | <0.1 | <0.1 | <0.1 | <0.1 | <0.1 | <0.1 | <0.1 |
| Total component 2: | 18 | 18 | 16 | 16 | 16 | 21 | 21 |
| Total component 1 and 2: | 100 | 100 | 100 | 100 | 100 | 100 | 100 |
| PVC, %[3)] | 57.6 | 57.6 | 57.6 | 57.6 | 58.9 | 51.3 | 51.3 |
| SVR, % | 72.1 | 72.1 | 72.1 | 72.1 | 77.3 | 61.4 | 61.4 |
| SVR, % Component 1 | 72.8 | 72.8 | 72.8 | 72.8 | 79.5 | 61.7 | 61.7 |
| SVR, % Component 2 | 69.1 | 69.1 | 69.1 | 69.1 | 68.5 | 60.2 | 60.2 |
| Mixing ratio on volume, Component 1/2 | 3:1 | 4;1 | 4:1 | 4:1 | 4:1 | 4:1 | 4:1 |

[1)]Wetting/dispersing/scavenger/rheologic/thickening agent(s)
[2)]Defoamers/thixotropic
[3)]PVC: Pigment volume concentration. The ratio of the volume of pigment to the volume of total nonvolatile material.

Results

TABLE 2

| Results of rust creep, M | | |
|---|---|---|
| Paint Composition | Relative Max rust creep 924 h SST* | Relative Average rust creep 924 h SST* |
| Model paint A | 100 | 100 |
| Model paint B | 213 | 643 |
| Model paint C | 213 | 657 |
| Model paint D | 287 | 943 |

*Rust creep relative to composition according to the invention. The lower the relative rust creep, the better the performance.

TABLE 3

| Results of rust creep, M | |
|---|---|
| Paint Composition | Relative Average rust creep 6000 h SST* |
| Model paint E | 100 |
| Model paint F | 188 |
| Model paint G | 200 |

*Rust creep relative to composition according to the invention. The lower the relative rust creep the better the performance.

From table 2 and 3 it is evident that Model paints A and E comprised by the present invention show a significant improvement in rust creep compared to comparative Model paints B, C, D, F and G.

Example 2

Preparation of Test Panels

Steel panels are coated with 1×80 μm of the paint to be tested. The steel panels (75×150×10 mm) are cold rolled mild steel, abrasive blasted to Sat ½ (ISO 8501-1), with a surface profile equivalent to BN 9 (Rugotest No. 3). After the samples have been coated the panels are conditioned at a temperature of 23±2° C. and 50±5% relative humidity for a period of 7 days.

Salt Spray Test, According to ISO 4628-3:2003, Neutral Salt Spray.

This method is performed in order to evaluate the corrosion resistance of a coating system by reproducing the corrosion that occurs in atmosphere containing salt spray or splash.

The operation conditions of the salt spray test are constant spray with 5% NaCl solution at 35° C.

The SST was evaluating by ISO 4628-3:2003 which measure the stage of oxidation on a coated panel.

Preparation of Coating Compositions

Component 1 was prepared in the following way:

The aliphatic epoxy resin(s), extender pigment/filler, wetting and dispersing agent, rheologic and thickening agent and antifoaming agent, graphite were premixed on a high speed mixer equipped with an impeller disc (90 mm in diameter) in a 2 litre can for 15 minutes at 1500 rpm. Microspheres were added under slow stirring 600 rpm together with 10% of the solvents. The remaining 90% of solvent was then added.

Component 2 was prepared in the following way:

The amino functional siloxane resin and polysiloxane, antifoaming agent, thixotropic agent, wetting and dispersing agent were premixed on a high speed mixer equipped with an impeller disc (90 mm in diameter) in a 2 litre can for 15 minutes at 1200 rpm. The zinc particles with 10% of solvent were added and mixed for about 15 minutes at 2000 rpm. The remaining 90% of solvent was then added.

When preparing the comparative model paints the step of adding graphite and/or glass spheres were omitted.

Just before the application, component 2 was added to component 1 and the paint composition was mixed to a homogenous mixture.

TABLE 4

| Basic formulation of polysiloxane-based paints | | | | |
|---|---|---|---|---|
| | Model paint A % SV | Model paint B % SV | Model paint C % SV | Model paint D % SV |
| Component 1: | | | | |
| Aliphatic epoxy resin (Adeka resin EP-4080E ADEKA Corporation - Japan) | 21.8 | 20.3 | 20.4 | 21.9 |
| Calcium carbonate, coated with stearic acid, extender pigment | 2.8 | 17.9 | 19.3 | 4.2 |

TABLE 4-continued

Basic formulation of polysiloxane-based paints

|  | Model paint A % SV | Model paint B % SV | Model paint C % SV | Model paint D % SV |
|---|---|---|---|---|
| Macrocrystalline graphite, P.Bk. 10 | 1.9 | 1.8 | — | — |
| Additives[1)] | 1.3 | 1.3 | 1.2 | 1.3 |
| Solvents: | | | | |
| Xylene | | | | |
| Butanol | | | | |
| Butylacetate | | | | |
| Aluminosilicate glass spheres, | 19.8 | — | — | 19.9 |
| Total component 1: | 47 | 41 | 41 | 47 |
| Component 2: | | | | |
| Amino functional siloxane resin solution (SILRES HP 2000, Wacker Chemie GmbH - Germany) | 19.8 | 18.4 | 18.5 | 19.9 |
| Polysiloxane with methoxygroups | 11.1 | 10.3 | 10.4 | 11.1 |
| Zinc dust, metallic pigment | 20.3 | 28.8 | 28.9 | 20.4 |
| Additives[2)] | 1.3 | 1.1 | 1.2 | 1.3 |
| Solvents: | | | | |
| Xylene | | | | |
| Total component 2: | 53 | 59 | 59 | 53 |
| Total component 1 and 2: | 100 | 100 | 100 | 100 |
| PVC, % | 46 | 49.7 | 49.4 | 45.8 |
| SVR, % | 88 | 88.7 | 88.8 | 88 |

[1)]Wetting and dispersing/rheologic and thickening/antifoaming agent(s) [2)]Antifoaming/thixotropic/wetting and dispersing agent(s)

Results

TABLE 5

Results of SST

| Paint Composition | Results of SST after 275 h | | Results of SST after 500 h | | Results of SST after 1000 h | |
|---|---|---|---|---|---|---|
|  | panel 1 | panel 2 | panel 1 | panel 2 | panel 1 | panel 2 |
| Model paint-A | Ri1 | Ri1 | Ri1 | Ri1 | Ri2 | Ri2 |
| Model paint B | Ri3 | Ri2 | Ri4 | Ri3 | Ri4 | Ri4 |
| Model paint C | Ri2 | Ri3 | Ri2 | Ri3 | Ri3 | Ri3 |
| Model paint D | Ri3 | Ri3 | Ri3 | Ri3 | Ri4 | Ri4 |

*Result of SST are evaluated by an aspect scale, it starts from $R_i0$ = very good, to $R_i5$ = very bad

Example 3

Testing According to ISO 20340

The panels are exposed according to ISO 20340 Procedure A: Standard procedure with low-temperature exposure (thermal shock).

The exposure cycle used in this procedure lasts a full week (168 h) and includes 72 h of QUV, 72 h of Salt Spray test (SST) and 24 h of thermal shock (−20° C.)

The QUV exposure is according to ISO 11507, accelerated weathering, by exposure to fluorescent ultraviolet (UV) light and condensation in order to simulate the deterioration caused by sunlight and water as rain or dew. QUV cycle: 4 hours UV-light at 60±3° C. with UVA-340 lamps and 4 hours condensation at 50±3° C.

The SST exposure is according to ISO 7253, exposure to constant spray with 5% NaCl solution at 35° C.

The thermal shock exposure consists of placing the panels in a freezer, at −20±2° C.

Total period of exposure: 25 cycles equal to 4200 hours.

Before the panels are started in the climatic cycle, they are given a 2 mm-wide score placed horizontally, 20 mm from the bottom and sides.

When the test is stopped, the paint film is removed from the score, and the width of the rusting is evaluated. After removing the coating by a suitable method, the width of the corrosion is measured at nine points (the midpoint of the scribe line and four other points, 5 mm apart, on each side of the midpoint). The rust creep M is calculated from the equation $M=(C-W)/2$, where C is the average of the nine width measurements and W is the original width of the scribe.

Preparation of Test Panels for Testing According to ISO 20340

The steel panels used for testing (7×15 cm×5 mm) are cold rolled mild steel, abrasive blasted to Sa 3 (ISO 8501-1), with a surface profile equivalent to BN 9 (Rugotest No. 3).

The complete coating system that was applied to the steel panels is shown below:

First Coat: Model paint in film thickness of 60 μm

Second Coat: Intermediate epoxy coating Hempadur 45880 in film thickness 140 μm

Third Coat: Topcoat polyurethane Hempathane 55610 in film thickness 80 μm

An overnight drying period was used in between coating layers.

After the samples have been coated the panels are conditioned at a temperature of 23±2° C. and 50±5% relative humidity for a period of 7 days.

Preparation of Coating Compositions

The Model paint of the first coat was prepared in the same manner as the model paints in Example 1.

TABLE 6

|  | Model paint 1 % SV | Model paint 2 % SV | Model paint 3 % SV | Model paint 4 % SV |
|---|---|---|---|---|
| Component 1: | | | | |
| Epoxy functional compound | | | | |
| Epoxy resin (Bisphenol A-epichlorydrin, Araldite DY-E/BD, ex. Huntsman Advanced Materials - Germany) | 28.0 | 29.1 | 28.5 | 30.4 |
| Reactive epoxy diluent, aliphatic ($C_{12}$-$C_{14}$) monoglycidyl ether | 4.0 | 4.0 | 3.8 | 4.0 |
| Zinc dust, metallic pigment, 95-97% Zn fine particle size | 39.6 | 39.8 | 49.5 | 52.2 |
| Scotchlite Glass Bubbles S38, 3M - France. Soda-lime borosilicate glass, microspheres with insulating properties. | 11.1 | 11.1 | — | — |
| Additives[1)] | 4.9 | 5.1 | 3.8 | 4.0 |
| Solvents: Xylene, butanol, isopropanol, medium-boiling aromatic hydrocarbon solvent, propyleneglycol monoethyl ether. | | | | |

TABLE 6-continued

|  | Model paint 1 % SV | Model paint 2 % SV | Model paint 3 % SV | Model paint 4 % SV |
|---|---|---|---|---|
| P.Bk. 10, Macrocrystalline graphite, heat resisting and anti-static pigment | 4.6 | — | — | — |
| P.Bk. 6/7, Carbon black | — | 3.0 | 5.6 | — |
| Total component 1: | 92.1 | 92.1 | 91.1 | 90.5 |
| Component 2: | | | | |
| Epoxy hardener, Hempadur 98382, Hempel | 7.9 | 7.9 | 8.9 | 9.5 |
| Total component 2: | 7.9 | 7.9 | 8.9 | 9.5 |
| Total component 1 and 2: | 100 | 100 | 100 | 100 |
| PVC, %[2)] | 58.2 | 56.8 | 57.9 | 55.1 |
| SVR | 60 | 60 | 60 | 57 |

[1)] Wetting and dispersing agent/thickening agent/rheologic modifier
[2)] PVC: Pigment volume concentration. The ratio of the volume of pigment to the volume of total nonvolatile material.

Results

TABLE 7

Results of rust creep, M

| Paint Composition | Rust creep SST* |
|---|---|
| Model paint 1 | 100 |
| Model paint 2 | 97 |
| Model paint 3 | 134 |
| Model paint 4 | 159 |

*Rust creep relative to Model paint 1 according to the invention. The lower the relative rust creep, the better the performance.

From table 7 it is evident that Model paints 1 and 2 comprised by the present invention show a significant improvement in rust creep compared to comparative Model paints 3 and 4.

This example shows that even though the amount of zinc is lower in the compositions according to the present invention than in the comparative compositions, the corrosion inhibition has improved.

Example 4

TABLE 8

Basic formulation of polyurethane based one component moisture curing paint. Components are mixed under vacuum.

|  | Model paint % SV |
|---|---|
| Isocyanate prepolymer based on diphenylmethane diisocyanate (MDI), Desmodur MT Ex Bayer MaterialScience - Germany | 8 |
| Polyisocyanate prepolymer based on toluene diisocyanate (TDI), Desmodur E 14 Ex Bayer Material Science - Germany | 8 |
| Aromatic polyisocyanate prepolymer based on diphenylmethane diisocyanate (MDI) Desmodur E 21 ex Bayer Material Science - Germany | 22 |
| K064 Modiefied aromatic hydrocarbon resin, Novares LA 700 ex Rütgers Novares, Germany | 4 |
| Additives[1] | 5 |
| Macrocrystalline graphite, Graphit AF 96/97, Graphitwerk Kropfmühl AG - Germany | 2 |
| Zinc particles, ZMP 4P16, Umicore- Belgium | 45 |
| Solvents: | |
| Aromatic hydrocarbon | |
| Methoxy propyl acetate | |
| Hollow glass microspheres, Scotchlite Glass Bubbles S38 ex 3M - France | 6 |
| Total component: | 100 |
| PVC % | 56 |
| SVR % | 67 |

[1] Plasticizer/Wetting/scavenger/rheologic/thickening agent(s)

Example 5

Preparation of Coating Compositions

Component 1 was prepared in the following way:

The hydroxyfunctional acrylic resin solution, wetting and dispersing agent, antifoaming agent, thickening agent, filler, graphite and 75% of the solvents were premixed on a high speed mixer equipped with an impeller disc (90 mm in diameter) in a 2 litre can for 15 minutes at 1200 rpm. The zinc particles were then added and mixed for about 15 minutes at 2500 rpm. A catalyst dissolved in solvent was added under stirring as a let-down. Microspheres were added under slow stirring 600 rpm together with 5% of the solvents. The remaining 20% of solvent was then added.

Component 2 was prepared in the following way:

The polyfunctional aliphatic isocyanate resin was mixed with 70% solvent on a high speed mixer equipped with an impeller disc (90 mm in diameter) in a 5 litre can for 15 minutes at 1000 rpm. The remaining 30% of solvent were mixed.

Just before the application, component 2 was added to component 1 and the paint composition was mixed to a homogenous mixture.

TABLE 9

Basic formulation of polyurethane based two-component paint.

|  | Model paint 1 % SV | Model paint 2 % SV | Model paint 3 % SV | Model paint 4 % SV |
|---|---|---|---|---|
| Component 1: | | | | |
| Hydroxyfunctional acrylic resin solution in aromatic hydrocarbon, Synocure 878 N 60, Arkema - Spain | 32.7 | 32.7 | 32.7 | 32.7 |
| Calcium carbonate, coated with stearic acid, extender pigment | 26.0 | 11.5 | 23.7 | 9.6 |
| Zinc dust, metallic pigment, 95-97% Zn fine particle size | 31.2 | 22.0 | 31.2 | 21.7 |
| Aluminosilicate glass spheres | — | 23.7 | — | 23.6 |
| Additives[1)] | 1.3 | 1.3 | 1.3 | 1.3 |
| Solvents: Butylester acetate, xylene, aromatic hydrocarbon solvent. | | | | |

TABLE 9-continued

Basic formulation of polyurethane based two-component paint.

| | Model paint 1 % SV | Model paint 2 % SV | Model paint 3 % SV | Model paint 4 % SV |
|---|---|---|---|---|
| P.Bk. 10, Macrocrystalline graphite, heat resisting and anti-static pigment | — | — | 2.3 | 2.3 |
| Total component 1: | 91.1 | 91.2 | | |
| Component 2: | | | | |
| Polyfunctional aliphantic isocyanate resin (Basonat HB 175 MP/X BASF- Germany) | 8.9 | 8.9 | 8.9 | 8.9 |
| Total component 2: | 8.9 | 8.9 | 8.9 | 8.9 |
| Total component 1 and 2: | 100 | 100 | 100 | 100 |
| PVC, %[2)] | 57.6 | 57.6 | 57.6 | 57.6 |
| SVR | 63.5 | 63.5 | 63.5 | 72.1 |

Example 6

Various types of hollow glass microspheres were tested according to Example 1. Hollow glass microspheres having true densities of 0.2, 0.2, 0.3, 0.38, and 0.40 g/cc, respectively, all gave qualitatively similar results.

The invention claimed is:

1. A coating composition comprising:
    a) a binder system selected from the group consisting of epoxy-based binder systems comprising one or more curing agents selected from compounds or polymers comprising at least two reactive hydrogen atoms linked to nitrogen, polysiloxane-based binder systems, polyurethane-based binder systems, cyclized rubber-based binder systems, and phenoxy resin-based binder systems,
    b) zinc particles,
    c) non-coated hollow glass microspheres, and
    d) a conductive pigment consisting of graphite in an amount of 0.1 to 3.8% by weight, carbon black, aluminium pigments, black iron oxide, antimony-doped tin oxide, mica coated with antimony-doped tin oxide, indium tin oxide, carbon nanotubes, carbon black fibres, graphene, or any mixture thereof,
    wherein the composition further comprises a solvent.

2. The coating composition according to claim 1, wherein the conductive pigment is selected from the group consisting of carbon black, carbon nanotubes, graphite, and any mixture thereof.

3. The coating composition according to claim 2, wherein the conductive pigment is graphite.

4. The coating composition according to claim 2, wherein the conductive pigment is carbon black.

5. The coating composition according claim 1, wherein said binder system is an epoxy-based binder system, a polyurethane-based binder system, or a polysiloxane-based binder system.

6. The coating composition according to claim 1, wherein said binder system is an epoxy-based binder system or a polysiloxane-based binder system.

7. The coating composition according to claim 1, wherein said binder system is an epoxy-based binder system.

8. The coating composition according to claim 1, wherein the conductive pigment is present in an amount of between about 0.5 to 5.0% by solids volume of the coating composition.

9. The coating composition according to claim 1, wherein the conductive pigment is graphite present in an amount of less than 3.5% by weight of the total composition.

10. The coating composition according to claim 1, wherein the hollow glass microspheres are present in an amount of less than 5.9% by weight of the composition.

11. The coating composition according to claim 1, wherein the hollow glass microspheres are present in an amount of between about 10 and 30% by solids volume.

12. The coating composition according to claim 1, wherein the hollow glass microsphere have a true density of about 0.05 to 0.75 g/cc.

13. The coating composition according to claim 1, comprising one or more curing agents.

14. The coating composition according to claim 1, wherein the graphite is present in an amount of 0.5-3.5% by weight based on the coating composition.

15. A kit of parts containing a coating composition, as defined in claim 13, comprising two or more containers, wherein one container contains one or more curing agents and another container contains a binder system in the absence of a curing agent, wherein the binder system is selected from the group consisting of epoxy-based binder systems, polysiloxane-based binder systems, polyurethane-based binder systems, cyclized rubber-based binder systems, and phenoxy resin-based binder systems.

16. The kit of parts according to claim 15, wherein the zinc particles and hollow glass microspheres are contained in the same container as a binder system selected from the group consisting of epoxy-based binder systems, polysiloxane-based binder systems, polyurethane-based binder systems, cyclized rubber-based binder systems, and phenoxy resin-based binder systems, and wherein a conductive pigment selected from the group consisting of graphene, graphite, carbon black, aluminium pigments, black iron oxide, antimony-doped tin oxide, mica coated with antimony-doped tin oxide, indium tin oxide, carbon nanotubes, carbon black fibres, and any mixture thereof is contained in the same container as the one or more curing agents.

17. A coated structure comprising a metal structure having a coating of the coating composition as defined in claim 1 applied onto at least a part of the metal structure.

18. A method of coating a metal structure, comprising:
    applying a layer of a coating composition as defined in claim 1 to at least a part of the metal structure.

* * * * *